No. 755,222. Patented March 22, 1904.

UNITED STATES PATENT OFFICE.

ERNST WILHELM ENGELS, OF DÜSSELDORF, GERMANY.

PROCESS OF TREATING PLUMBIFEROUS ORES.

SPECIFICATION forming part of Letters Patent No. 755,222, dated March 22, 1904.

Application filed October 5, 1903. Serial No. 175,766. (No specimens.)

*To all whom it may concern:*

Be it known that I, ERNST WILHELM ENGELS, a subject of the King of Prussia, Emperor of Germany, residing at Düsseldorf, Kingdom of Prussia, German Empire, have invented a new and useful Process of Treating Plumbiferous Ores, of which the following is a specification.

This invention relates to the smelting of plumbiferous ores, including so-called "complex" ores, for the purpose of obtaining metals therefrom; and the object of the process is to treat plumbiferous ores at high temperatures in such way as to diminish the chemical and physical reactions which take place between the walls of the vessels or receptacles employed and the ores or ore products present during the treatment. This enables the reduction of ores, especially complex ores, to be practiced in a more advantageous and economical manner than heretofore. It is well known that there are abundant beds of certain plumbiferous ores containing varying proportions of zinc and that these ores are commonly called "complex" ores. It is further known that these ores are left unexploited because of the difficulty presented by the extraction of zinc contained in the ores and the fact that without the recovery of the zinc the working of said ores is not remunerative. If treated as lead ores are commonly treated, the zinc contained in complex ores is mostly wasted on account of the zinc oxid being evaporizable, and when treated in a retort or muffle, as is done with zinc ores, the vessel is rapidly destroyed by the dissolving action of the lead oxids formed. It is this difficulty which has thwarted all efforts of metallurgists. By the present new discovery it is made possible that which has not before been practicable—that is to say, there is brought under human control an abundantly-present natural product of high value.

I have discovered the very striking fact that the destructive action of molten lead oxids upon refractory-clay is with great efficiency counteracted by mixing the clay with a certain proportion of carborundum—that is, carbid of silicon. This effect of carborundum is the more striking for the reason that this substance reacts in a very violent manner when brought in contact with molten lead oxids, the carborundum being decomposed with the formation of silicic acid and carbonic oxid, which escape, while the lead oxids are partly reduced to metal and partly bound to the silicic acid, forming a silicate of lead.

My invention is based upon the fact that a suitable mixture of two substances—that is to say, clay and carborundum—each of which is decomposed by molten lead oxids when separately brought in contact with them prevents molten lead oxids from reacting with either of them, as these two substances so coact one with the other in the presence of the lead oxids that they mutually protect each other from the action of the lead oxids. The proportion of carborundum to be added varies with the nature of the clay to be had and has to be determined by experiments. A very careful and expensive investigation has, however, shown that in order to secure the best result the carborundum must be added to the clay in such proportion that there is not less than twenty-five nor more than ninety per cent. of carborundum and not less than ten or more than seventy-five per cent. of clay. Smaller proportions of carborundum have proved to be incapable of excluding the decomposing action of molten lead oxids which takes place in increasing proportion as the quantity of carborundum decreases. To enable the process to be perfectly carried out, the vessel should first be made of a wet intimate mixture of ground clay and carborundum, the mixture being formed into the vessels, preferably under pressure, and the vessels being then allowed to dry and finally burned at a temperature of about $1,000°$ centigrade. It is known that articles in which carborundum is employed have been made, but only for use in connection with materials in which there is no chemical reaction between the material treated and the carborundum, and it is also known that vessels have been constructed especially for the extraction of zinc by way of distillation of carborundum and some clay to serve as a binder, but not in such proportions so that the carborundum is protected by the presence of the clay and the clay by the presence of the carborundum.

Having thus described my invention, what I claim as my invention and as a new discovery, and desire to secure by Letters Patent, is—

1. The process of treating plumbiferous ores at high temperatures and diminishing the chemical and physical reactions taking place between the walls of the vessels employed and the ores or ore products present during the treatment, said process consisting in conducting the treatment in receptacles composed largely of clay and carborundum, in the relative proportion of not less than twenty-five per centum, nor more than ninety per centum of carborundum, and not more than seventy-five per centum, nor less than ten per centum of clay.

2. The improvement in the art of treating plumbiferous ores at high temperatures which consists in conducting the treatment in receptacles exposing clay and carborundum at the surfaces of their walls to the action of the said ores or ore products in such proportions whereby the carborundum protects the clay and the clay protects the carborundum and the injurious action of the ores on such surfaces is thereby diminished by the conjoint use of the clay and carborundum, for substantially the purposes set forth.

In testimony whereof I have signed this specification in the presence of two subscribing witnesses.

ERNST WILHELM ENGELS.

Witnesses:
PETER LIEBER,
WILLIAM ESSENWEIN.